US012654569B2

(12) United States Patent
Sullivan et al.

(10) Patent No.: US 12,654,569 B2
(45) Date of Patent: Jun. 16, 2026

(54) MOTOR COGGING TORQUE MANAGEMENT FOR DRIVER COMFORT AND CONFIDENCE

(71) Applicant: FCA US LLC, Auburn Hills, MI (US)

(72) Inventors: Mary Claire Sullivan, Auburn Hills, MI (US); Sezai Osman Oder, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 30 days.

(21) Appl. No.: 18/958,165

(22) Filed: Nov. 25, 2024

(65) Prior Publication Data

US 2026/0145550 A1      May 28, 2026

(51) Int. Cl.
*B60L 15/20*            (2006.01)

(52) U.S. Cl.
CPC ....... *B60L 15/2063* (2013.01); *B60L 2240/12* (2013.01); *B60L 2240/423* (2013.01)

(58) Field of Classification Search
CPC ............. B60L 15/2063; B60L 2240/12; B60L 2240/423; B60L 2240/421; B60L 2270/145; B60L 15/007; B60L 15/20; B60L 2220/42; Y02T 10/62; Y02T 10/64; B60W 10/08; B60W 2520/10; B60W 20/00; B60W 2710/081; B60W 2710/083; B60W 30/20; H02K 1/2753; H02K 1/276; H02K 1/27; B60Y 2200/92; B60Y 2200/91

See application file for complete search history.

(56) References Cited

U.S. PATENT DOCUMENTS

| | | | |
|---|---|---|---|
| 7,425,786 B2 | 9/2008 | Hino et al. | |
| 8,164,282 B2 | 4/2012 | Okamura | |
| 8,948,949 B2 * | 2/2015 | Tagawa ................. | B60W 20/40 |
| | | | 477/4 |
| 9,925,889 B2 | 3/2018 | Hao et al. | |
| 10,618,762 B2 * | 4/2020 | Osaki ...................... | B60R 22/46 |
| 11,007,878 B2 * | 5/2021 | Kamino ................. | B60L 50/51 |

(Continued)

FOREIGN PATENT DOCUMENTS

| | | |
|---|---|---|
| CN | 113928129 A | 1/2022 |
| JP | 2008271641 A | 11/2008 |

OTHER PUBLICATIONS

Simulation analysis of cogging torque of permanent magnet synchronous motor for electric vehicle (Year: 2012).*

*Primary Examiner* — Fadey S. Jabr
*Assistant Examiner* — Faris Asim Shaikh
(74) *Attorney, Agent, or Firm* — Jeremy J. Klobucar

(57)            ABSTRACT

A motor cogging management system for an electrified vehicle includes a set of sensors configured to monitor a set of parameters for the electrified vehicle, wherein the set of parameters includes at least a speed of the electrified vehicle and a control system configured to determine whether cogging torque management is required for a first electric motor of the electrified vehicle based on the set of parameters, determine a maximum cogging management torque based on the set of parameters, determine a sign for the cogging torque management based on the set of parameters, and perform the cogging torque management by commanding additional torque at the first electric motor based on the determined maximum cogging management torque and the determined sign.

16 Claims, 5 Drawing Sheets

(56)        References Cited

U.S. PATENT DOCUMENTS

| | | | |
|---|---|---|---|
| 2009/0140590 A1* | 6/2009 | Hung | H02K 1/276 310/156.32 |
| 2009/0224627 A1* | 9/2009 | Hino | H02K 1/276 310/156.53 |
| 2011/0147028 A1* | 6/2011 | Iwashita | H02P 6/10 173/176 |
| 2011/0288706 A1* | 11/2011 | Okamura | B60L 3/0092 701/22 |
| 2012/0143426 A1* | 6/2012 | Yamamoto | B60K 6/383 903/903 |
| 2015/0280535 A1* | 10/2015 | Yang | H02K 1/278 310/156.38 |
| 2018/0237246 A1* | 8/2018 | Osaki | B65H 18/10 |
| 2020/0162003 A1 | 5/2020 | Takahashi et al. | |
| 2020/0274431 A1* | 8/2020 | Abbott | H02K 7/14 |
| 2021/0313911 A1* | 10/2021 | Wildhaber | H02P 3/025 |
| 2023/0253869 A1* | 8/2023 | Koyama | H02K 7/116 74/490.03 |
| 2025/0001874 A1* | 1/2025 | Chetty | B60L 15/20 |

* cited by examiner

MOTOR COGGING TORQUE MANAGEMENT FOR DRIVER COMFORT AND CONFIDENCE

FIELD

The present application generally relates to electrified vehicles and, more particularly, to motor cogging torque management techniques for driver comfort and confidence.

BACKGROUND

An electrified vehicle includes at least one electric motor configured to generate drive torque at an axle. One type of electric motor is a permanent magnet motor, which includes a fixed stator having permanent magnets defining poles and a rotatable rotor having electromagnetic windings. Motor cogging is a phenomenon that occurs when a magnet tugs on other component(s) as the axle is spinning (the vehicle is moving). This is not noticeable at higher vehicle speeds, but can be noticeable at lower vehicle speeds where the axle is free to wiggle within a lash zone (between two gear teeth). While motor cogging could occur in single motor electrified vehicles, it is more prevalent in multiple motor vehicles (e.g., one or more motors-per-axle) where one of the motors could be at zero torque. Conventional solutions to this problem include costly hardware-based solutions (e.g., redesigning the motor). Accordingly, while such conventional solutions do work well for their intended purpose, there exists an opportunity for improvement in the relevant art.

SUMMARY

According to one example aspect of the invention, a motor cogging management system for an electrified vehicle is presented. In one exemplary implementation, the motor cogging management system comprises a set of sensors configured to monitor a set of parameters for the electrified vehicle, wherein the set of parameters includes at least a speed of the electrified vehicle and a control system configured to determine whether cogging torque management is required for a first electric motor of the electrified vehicle based on the set of parameters, determine a maximum cogging management torque based on the set of parameters, determine a sign for the cogging torque management based on the set of parameters, and perform the cogging torque management by commanding additional torque at the first electric motor based on the determined maximum cogging management torque and the determined sign.

In some implementations, the electrified vehicle has a two-motor battery electric vehicle (BEV) configuration with the first electric motor arranged at a first axle and a second electric motor arranged at a different second axle. In some implementations, the electrified vehicle further includes a disconnect system configured to selectively connect and disconnect the first electric motor from the first axle, and wherein the first axle is a front axle and the second axle is a rear axle. In some implementations, the control system is configured to determine whether the cogging torque management is required based on a drive mode of the electrified vehicle, and wherein the drive mode is one of a single-motor drive mode and a dual-motor drive mode. In some implementations, the set of parameters further include torques of the first and second electric motors.

In some implementations, the first electric motor is a permanent magnet electric motor, and wherein a magnet of the permanent magnet electric motor causes motor cogging at vehicle speeds below a vehicle speed threshold. In some implementations, the control system is configured to determine that cogging torque management is required when the vehicle speed is less than the vehicle speed threshold. In some implementations, the control system is configured to perform the cogging torque management via software only and without modifying hardware of the electrified vehicle.

According to another example aspect of motor cogging management method for an electrified vehicle is presented. In one exemplary implementation, the motor cogging management method comprises providing a set of sensors configured to monitor a set of parameters for the electrified vehicle, wherein the set of parameters includes at least a vehicle speed of the electrified vehicle, determining, by the control system, whether cogging torque management is required for a first electric motor of the electrified vehicle based on the set of parameters, determining, by the control system, a maximum cogging management torque based on the set of parameters, determining, by the control system, a sign for the cogging torque management based on the set of parameters, and performing, by the control system, the cogging torque management by commanding additional torque at the first electric motor based on the determined maximum cogging management torque and the determined sign.

In some implementations, the electrified vehicle has a two-motor BEV configuration with the first electric motor arranged at a first axle and a second electric motor arranged at a different second axle. In some implementations, the electrified vehicle further includes a disconnect system configured to selectively connect and disconnect the first electric motor from the first axle, and wherein the first axle is a front axle and the second axle is a rear axle. In some implementations, the determining of whether the cogging torque management is required is based on a drive mode of the electrified vehicle, and wherein the drive mode is one of a single-motor drive mode and a dual-motor drive mode. In some implementations, the set of parameters further include torques of the first and second electric motors.

In some implementations, the first electric motor is a permanent magnet electric motor, and wherein a magnet of the permanent magnet electric motor causes motor cogging at vehicle speeds below a vehicle speed threshold. In some implementations, the determining that cogging torque management is required is when the vehicle speed is less than the vehicle speed threshold. In some implementations, the performing of the cogging torque management by the control system is via software only and without modifying hardware of the electrified vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, motor cogging is a phenomenon that occurs when a magnet of a permanent magnet electric motor tugs on other component(s) as the axle is spinning (the vehicle is moving). This is not noticeable at higher vehicle speeds, but can be noticeable at lower vehicle speeds where the axle is free to wiggle within a lash zone (between two gear teeth). While motor cogging could occur in single motor electrified vehicles, it is more prevalent in multiple motor vehicles (e.g., one or more motors-per-axle) where one of the motors could be at zero torque. Conventional solutions to this problem include costly hardware-based solutions (e.g., redesigning the motor). That is, the motors cannot be programmed in such a way where this does not happen, because it is a function of the hardware. However, this issue is not always perceivable. This issue is only perceivable when the motor is not loaded at low speeds. Accordingly, software-based motor cogging management systems and methods are presented herein.

Figure 1:
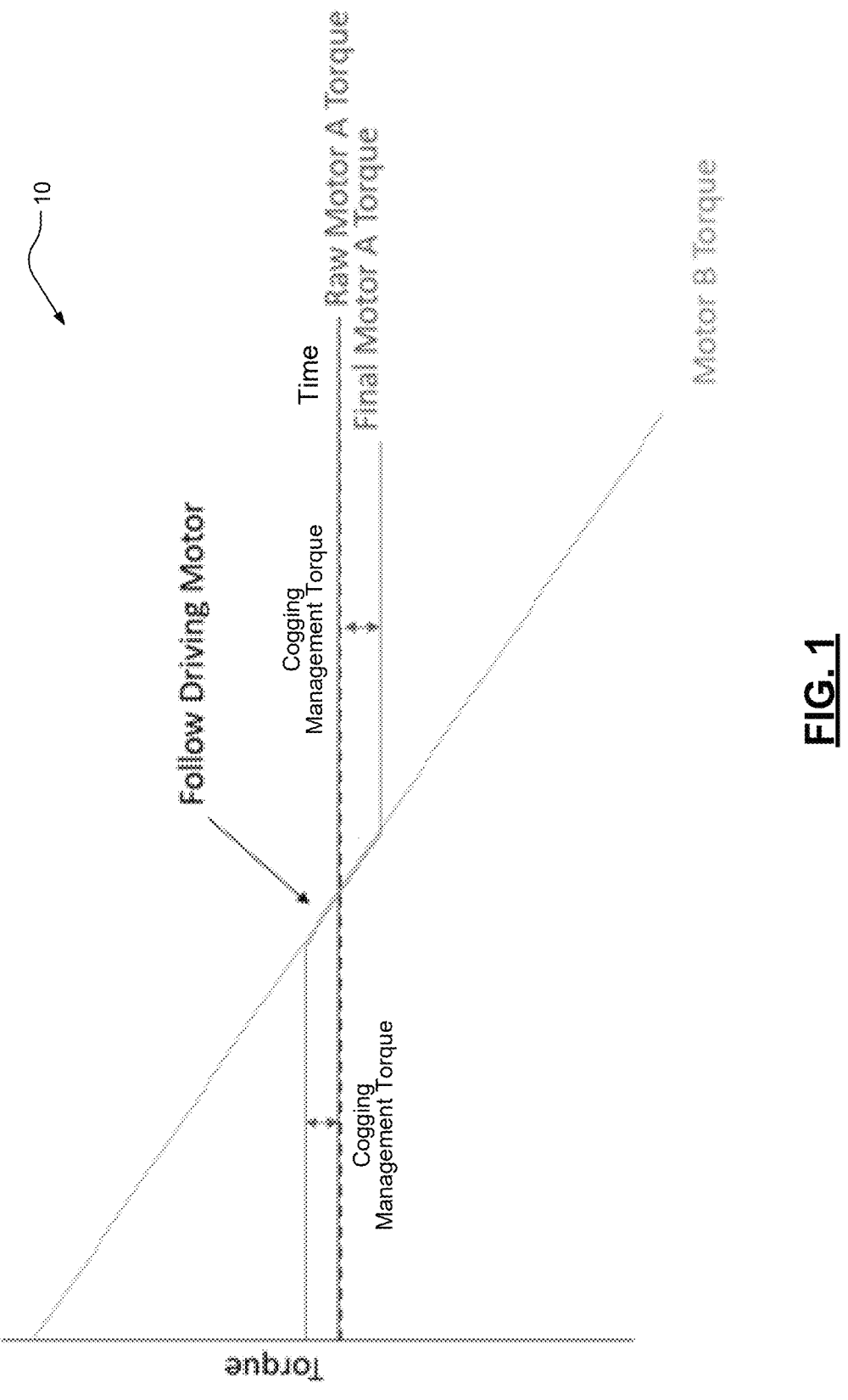
FIG. 1 is a plot of an example motor cogging torque management technique performed by a two-motor electrified vehicle according to the principles of the present application.

These techniques involve commanding a small amount of motor torque (to load the motor/gears) to mitigate or eliminate motor cogging. In one example embodiment, this occurs during a mode transition (e.g., single-axle drive to dual-axle drive) where one electric motor is achieving drive torque alone and another electric motor is being activated. The magnitude and sign of the cogging management torque is based on the driving motor's torque and sign (rotational direction). Potential benefits of these techniques include smoother motor enablement and electrified vehicle drive mode transitions (i.e., no NVH noticeable by the driver). In other words, to prevent the above-described cogging torque from being perceived by a driver, the software of the present application is adding a small amount of motor torque to load the motor and gears to prevent cogging. FIG. 1 illustrates an example plot 10 of this operation. As can be seen, motor B is loaded throughout, and a small cogging management torque is added to motor A.

Figure 2:
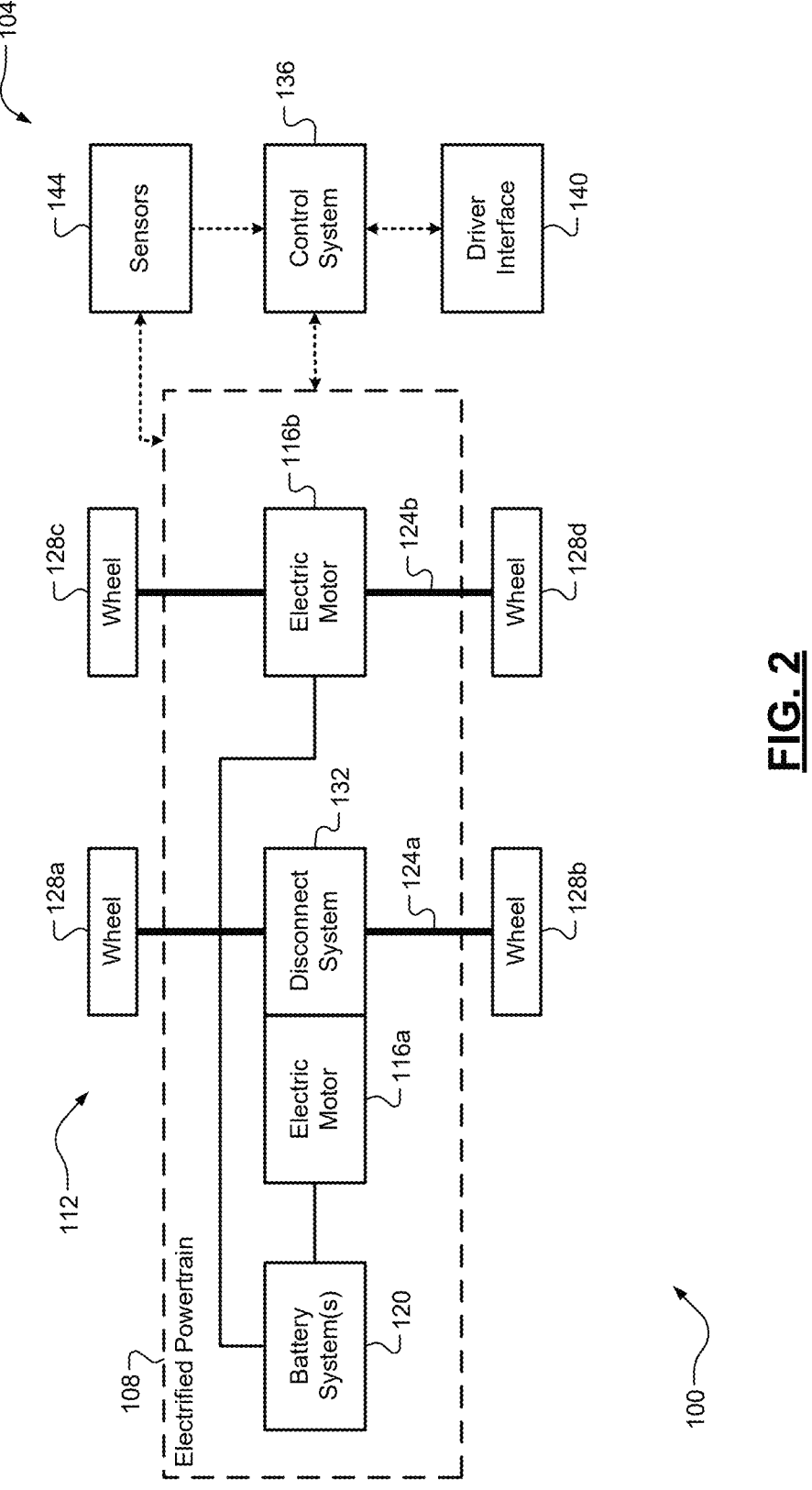
FIG. 2 is a functional block diagram of an electrified vehicle having an example motor cogging management system according to the principles of the present application.

Referring now to FIG. 2, a functional block diagram of an electrified vehicle 100 having an example motor cogging management system 104 according to the principles of the present application is illustrated. The electrified vehicle 100 generally comprises an electrified powertrain 108 that is configured to generate and transfer drive torque to a driveline 112 for vehicle propulsion. As shown, the electrified vehicle 100 is a battery electric vehicle (BEV) configuration, but it will be appreciated that the electrified vehicle 100 could have another suitable configuration (e.g., a hybrid powertrain). The electrified powertrain 108 includes one or more permanent magnet electric motors 116 powered by one or more high voltage battery packs or systems 120 (collectively referrable to as "electric drive modules" or EDMs).

In one exemplary implementation as shown, the electrified powertrain 108 includes front and rear permanent magnet electric motors 116a, 116b associated with front and rear axles 124a, 124b and pairs of front wheels 128a, 128b and rear wheels 128c, 128d, respectively, of the driveline 112. In one exemplary implementation, the driveline 112 can further include a disconnect system 132 (e.g., a front axle disconnect, or FAD, or a pair of wheel-end disconnects, or WEDs) for selectively disconnecting the front electric motor WEDs) for selectively disconnecting the front electric motor 116a from the front axle 124a. It will be appreciated that the electrified powertrain 108 could further include other non-illustrated components. For example, the electrified powertrain 108 could further include gears (not shown) coupled to output shafts (not shown) of the electric motors 116 and to the axles 124 or to intermediary components, such as a transmission or gear reducer and/or a differential.

A controller or control system 136 is configured to control operation of the electrified vehicle 100, which primarily includes controlling the electric motors 116 to generate a desired amount of drive torque to satisfy a driver torque request received via a driver interface 140 (e.g., an accelerator pedal). The control system 136 is also configured to receive measured parameters from a set of one or more sensors 144. Non-limiting examples of the parameters monitored or measured by the sensor(s) 144 include speeds/positions of components of the electrified powertrain 108 and the driveline 112, battery system parameters, and an electrified powertrain drive mode status (e.g., a status of the disconnect system 132). While a single control system 132 is shown and described, it will be appreciated that the control system 136 could include one or more electronic control units (ECUs) in communication via a controller area network (CAN). The control system 136 is also configured to perform at least a portion of the motor cogging management techniques of the present application, which will now be described in greater detail.

Figures 3A, 3B, 3C:
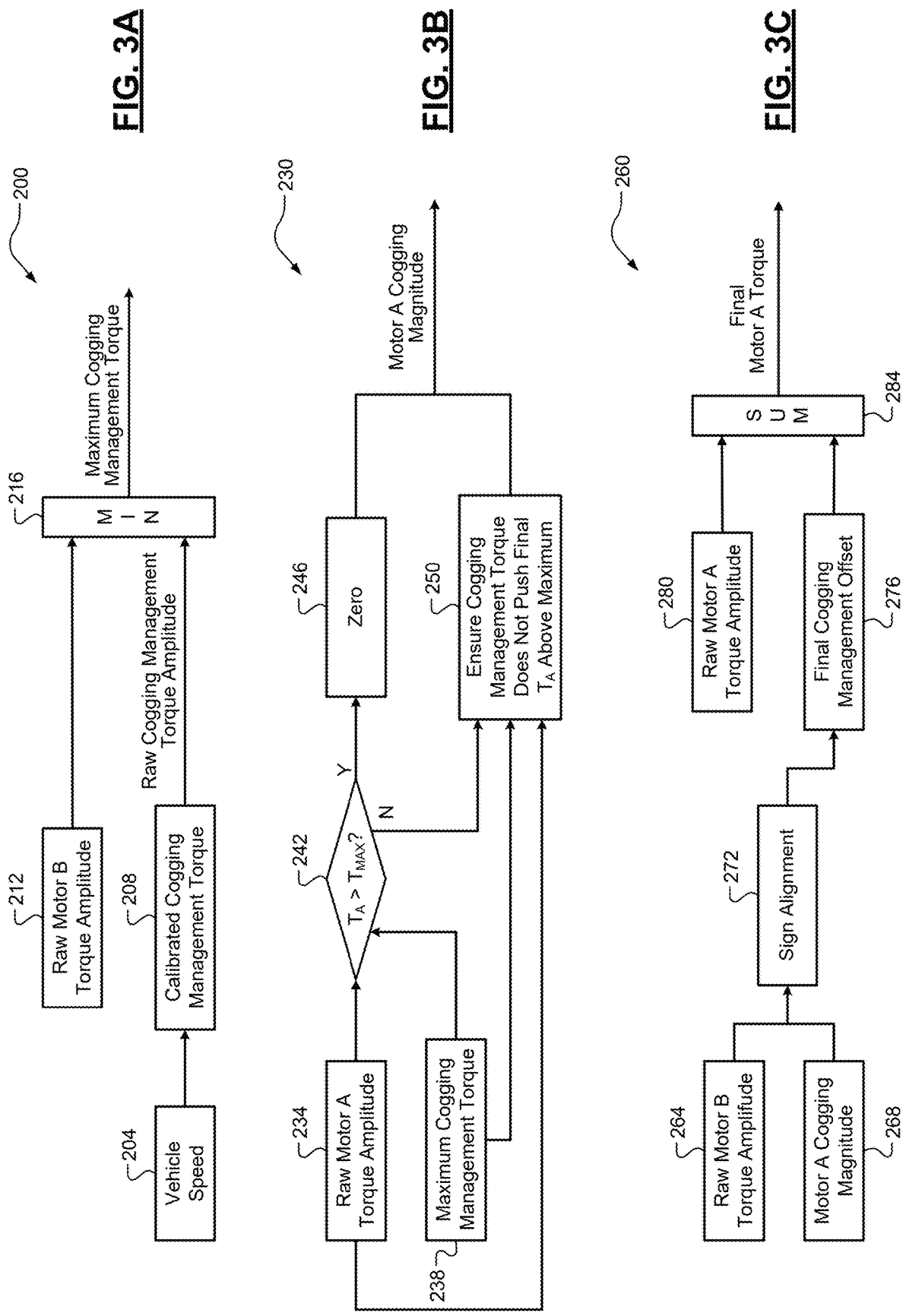
FIGS. 3A-3C are functional block diagrams of example architectures for the motor cogging management system according to the principles of the present application.

Referring now to FIGS. 3A-3C and FIG. 4, and with continued reference to FIGS. 1-2, functional block diagrams of example architectures 200, 230, and 260 for the motor cogging management system 104 and a corresponding plots 300 illustrating example cogging torque management operations according to the principles of the present application are illustrated. The full design is shown across all three FIGS. 3A-3C, and the same logic is applicable to both electric motors 116. As shown, if one of the electric motors 116 is at zero torque, the cogging management torque will be added, while aligning the sign to the other driving one of the electric motors 116. The illustrated design of FIGS. 3A-3C is specific to the two-axle BEV configuration illustrated in FIG. 2, where there are two electric motors 116 with one on each axle 124. The full logic will be broken down to its individual components 200, 230, and 260 in FIGS. 3A-3C.

In FIG. 3A, the factors that determine maximum additional torque are shown. The first factor is vehicle speed 204. That is, because cogging is only an issue at low speeds, cogging management torque 212 is only needed at low vehicle speeds and, otherwise, it can be zero. From there, the added torque cannot exceed the torque generated by the opposite motor, this prevents torque from being added when driver demand is zero. In FIG. 3A, the torque added to electric motor 116a cannot exceed the toque 208 commanded at electric motor 116b. Using these two factors, we have a base magnitude (a minimum 216) for the maximum allowable torque that can be added to mitigate cogging.

In FIG. 3B, the use case for transitioning from a single-axle drive mode to dual-axle drive mode is illustrated. This is a special case because of how the added torque gets filtered down impacts the final driver feel. This logic considers if electric motor 116a requires cogging management, based on current torque 234 of electric motor 116a. If the current torque of electric motor 116a exceeds the maximum cogging management torque 238 as arbitrated at 242, then we do not need any cogging management, and no torque (zero torque at 248) will be added to electric motor 116a. If the current torque 234 of electric motor 116a is less than maximum cogging management torque 238 at 242, then the combination of the current torque 234 of electric motor 116a and the added torque 238 should not exceed maximum cogging torque at 250. This transition can be seen in FIG. 3C. As the raw motor A torque comes up, the added torque goes down proportionally, until it hits zero.

Figure 4:
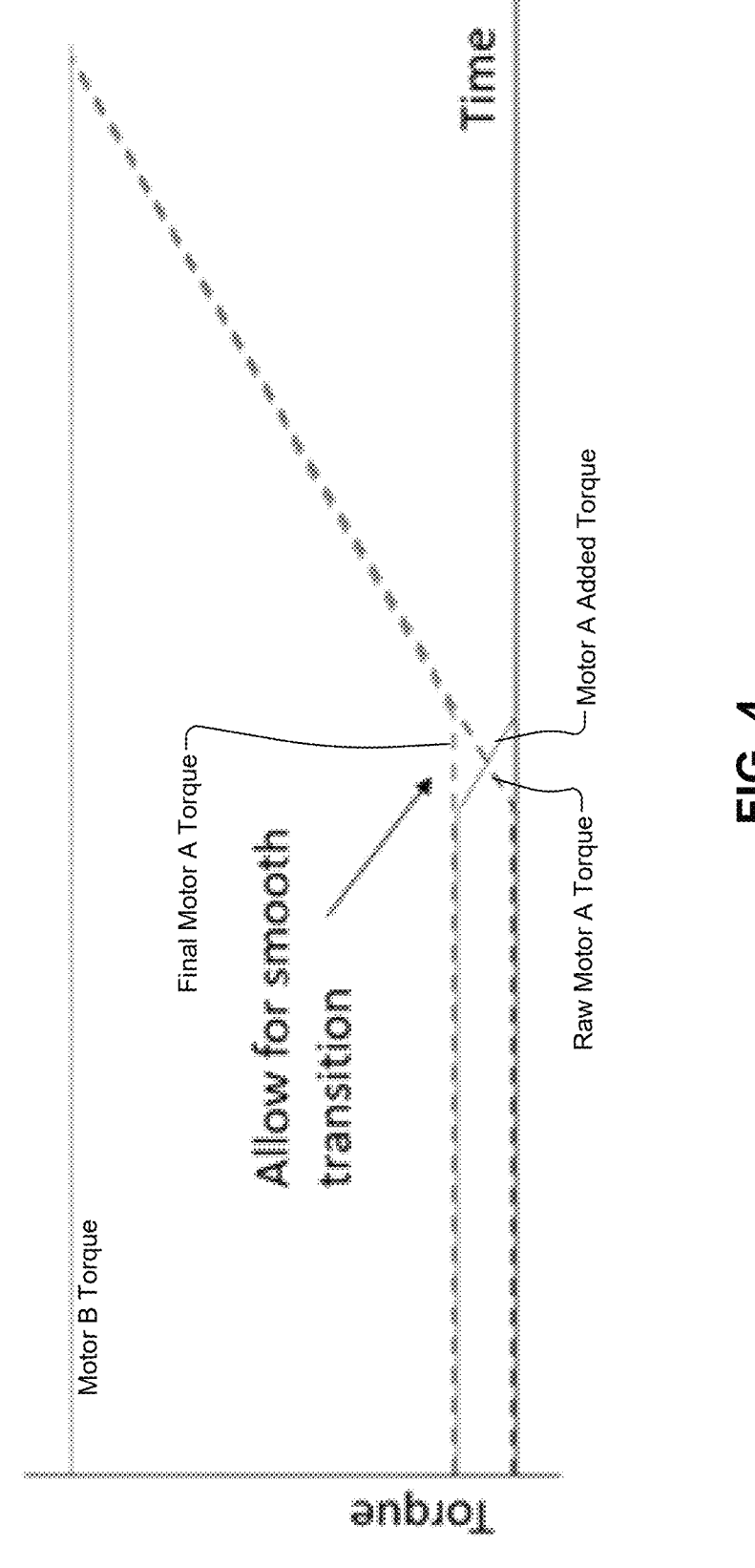
FIG. 4 is a plot of an example motor cogging management during an electrified vehicle mode transition according to the principles of the present application.

The final check shown in FIG. 3C is to convert the magnitude to the correct sign. Continuing the example used throughout, cogging management will look at the sign the torque 264 of electric motor 116b to determine the sign (at sign alignment 272) for the torque 268 for electric motor 116a. Finally, the cogging management torque offset 276 is added to the raw torque 280 for electric motor 116a (at sum block 284) to have a finalized torque for electric motor 116a that should minimize cogging whenever possible. FIG. 4 illustrated a plot 300 of an example cogging torque management procedure as described above for a two-axle BEV vehicle powertrain configuration.

Figure 5:
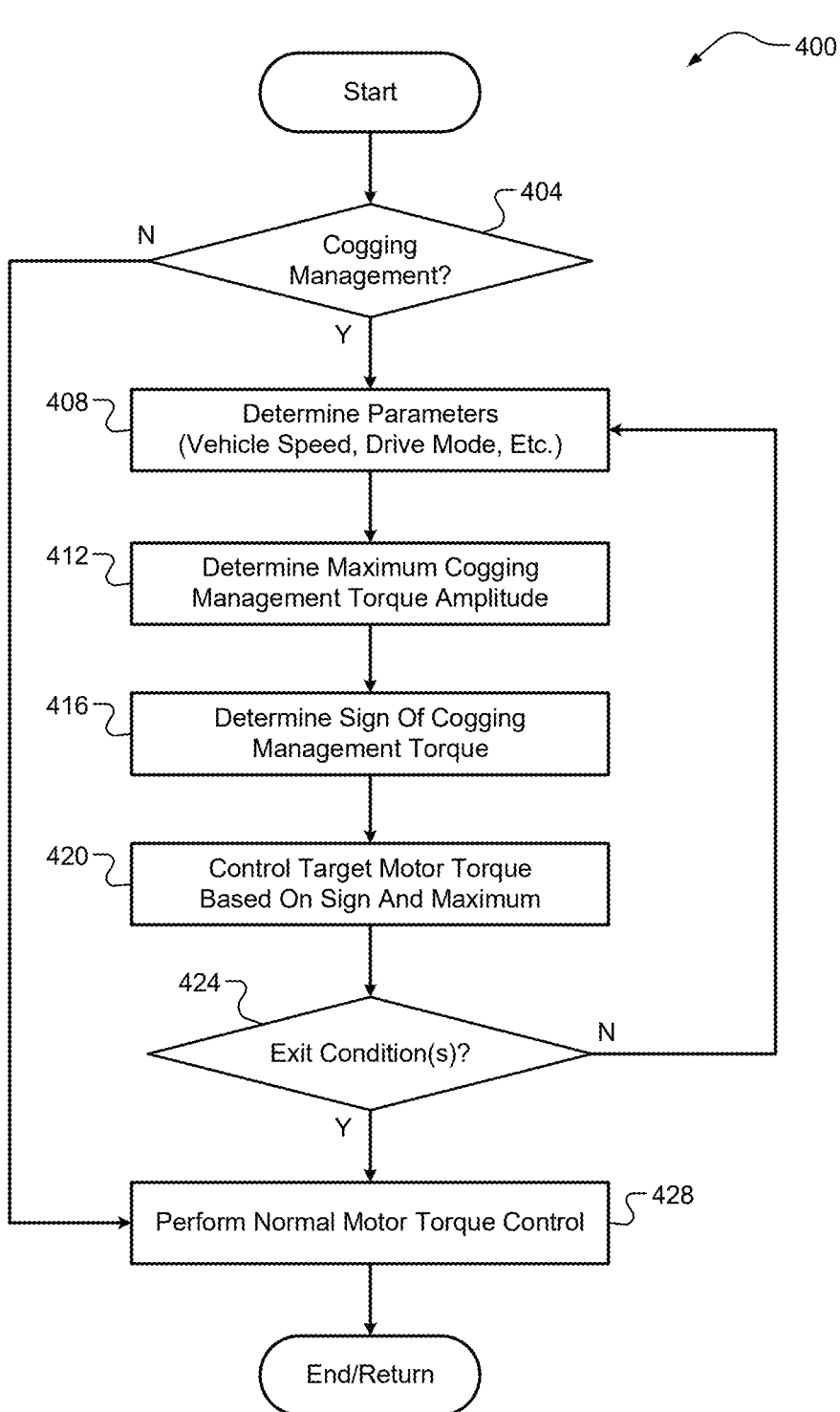
FIG. 5 is a flow diagram of an example motor cogging management method for an electrified vehicle according to the principles of the present application.

Referring now to FIG. 5 and with continued reference to the previous figures, a flow diagram of an example motor cogging management method 400 for an electrified vehicle according to the principles of the present application is illustrated. While the motor cogging management method 400 specifically references component(s) of the electrified vehicle 100, it will be appreciated that the motor cogging management method 400 could be applicable to any suitably-configured electrified vehicle having at least one permanent magnet electric motor where the motor cogging phenomenon can occur. The method 400 begins at 404 where the control system 136 determines whether cogging management is needed. This determination could include verifying that the electrified vehicle 100 is operating at a low speed state where electric motor cogging could occur and thus needs to be managed. This step 404 could also include verifying that no other malfunctions or faults are present that would negatively impact or otherwise affect the operation of these techniques. At 408, the control system 136 determines a set of parameters using the set of sensors 144. These parameters include, for example only, vehicle speed, a drive mode (e.g., single-axle drive more or dual-axle drive mode, based on a state of the disconnect system 132).

At 412, the control system 136 determines the maximum cogging management torque amplitude for a particular electric motor 116 (e.g., electric motor 116a) as shown herein and described above (see, e.g., FIG. 3A). At 416, the control system 136 determines the sign for the cogging management torque (e.g., electric motor 116a should match electric motor 116b) as shown and described above (see, e.g., FIG. 3C). At 420, the control system 136 controls the electric motors 116 based to achieved the cogging torque management as shown herein and described above (see, e.g., FIG. 3B). At 424, the control system 136 determines whether one or more exit conditions to end or terminate the cogging torque management are present. For example, this could include the vehicle speed exceeding a vehicle speed threshold. When false, the method 400 returns to 408 and cogging torque management continued. When true, however, the method 400 ends or returns to 404 for one or more additional cycles.

In summary, the phenomenon that is being solved with the present invention invention is that magnet(s) of the electric motor tug on other components as the axle is spinning (i.e., as the vehicle is moving). This is not noticeable when the axle is spinning faster than a certain speed, or if the electric motor is generating torque. When the axle is slow, however, and the electric motor is not generating a torque, the axle is free to wiggle within the lash zone. This tug of the magnet(s) can be very noticeable to a driver as noise/vibration/harshness (NVH). The present invention aims to remove the motor lash and keep the moving parts in contact by applying a small amount of torque, which solves the NVH issue. While this issue can occur with single-motor vehicles, the electric motor will always actuate some amount of cogging torque (mostly creep torque at the speeds we are interested in) to prevent this issue from arising. While applicable to single-motor vehicles, this problem is primarily noticeable in vehicles with multiple electric motors where one electric motor can creep and the other can be at zero torque.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A motor cogging management system for an electrified vehicle, the motor cogging management system comprising:
   a set of sensors configured to monitor a set of parameters for the electrified vehicle, wherein the set of parameters includes at least a speed of the electrified vehicle; and
   a control system configured to:
      determine whether cogging torque management is required for a first electric motor of the electrified vehicle based on the set of parameters;
      determine a maximum cogging management torque based on the set of parameters;
      determine a sign for the cogging torque management based on the set of parameters; and
      perform the cogging torque management by commanding additional torque at the first electric motor based on the determined maximum cogging management torque and the determined sign.

2. The motor cogging management system of claim 1, wherein the electrified vehicle has a two-motor battery electric vehicle (BEV) configuration with the first electric motor arranged at a first axle and a second electric motor arranged at a different second axle.

3. The motor cogging management system of claim 2, wherein the electrified vehicle further includes a disconnect system configured to selectively connect and disconnect the first electric motor from the first axle, and wherein the first axle is a front axle and the second axle is a rear axle.

4. The motor cogging management system of claim 3, wherein the control system is configured to determine whether the cogging torque management is required based on a drive mode of the electrified vehicle, and wherein the drive mode is one of a single-motor drive mode and a dual-motor drive mode.

5. The motor cogging management system of claim 4, wherein the set of parameters further include torques of the first and second electric motors.

6. The motor cogging management system of claim 1, wherein the first electric motor is a permanent magnet electric motor, and wherein a magnet of the permanent magnet electric motor causes motor cogging at vehicle speeds below a vehicle speed threshold.

7. The motor cogging management system of claim 6, wherein the control system is configured to determine that cogging torque management is required when the vehicle speed is less than the vehicle speed threshold.

8. The motor cogging management system of claim 1, wherein the control system is configured to perform the cogging torque management via software only and without modifying hardware of the electrified vehicle.

9. A motor cogging management method for an electrified vehicle, the motor cogging management method comprising:

providing a set of sensors configured to monitor a set of parameters for the electrified vehicle, wherein the set of parameters includes at least a vehicle speed of the electrified vehicle;

determining, by the control system, whether cogging torque management is required for a first electric motor of the electrified vehicle based on the set of parameters;

determining, by the control system, a maximum cogging management torque based on the set of parameters;

determining, by the control system, a sign for the cogging torque management based on the set of parameters; and performing, by the control system, the cogging torque management by commanding additional torque at the first electric motor based on the determined maximum cogging management torque and the determined sign.

10. The motor cogging management method of claim 9, wherein the electrified vehicle has a two-motor battery electric vehicle (BEV) configuration with the first electric motor arranged at a first axle and a second electric motor arranged at a different second axle.

11. The motor cogging management method of claim 10, wherein the electrified vehicle further includes a disconnect system configured to selectively connect and disconnect the first electric motor from the first axle, and wherein the first axle is a front axle and the second axle is a rear axle.

12. The motor cogging management method of claim 11, wherein the determining of whether the cogging torque management is required is based on a drive mode of the electrified vehicle, and wherein the drive mode is one of a single-motor drive mode and a dual-motor drive mode.

13. The motor cogging management method of claim 12, wherein the set of parameters further include torques of the first and second electric motors.

14. The motor cogging management method of claim 9, wherein the first electric motor is a permanent magnet electric motor, and wherein a magnet of the permanent magnet electric motor causes motor cogging at vehicle speeds below a vehicle speed threshold.

15. The motor cogging management method of claim 14, wherein the determining that cogging torque management is required is when the vehicle speed is less than the vehicle speed threshold.

16. The motor cogging management method of claim 9, wherein the performing of the cogging torque management by the control system is via software only and without modifying hardware of the electrified vehicle.

\* \* \* \* \*